（12) United States Patent
Lancaster

(10) Patent No.: US 9,003,751 B2
(45) Date of Patent: Apr. 14, 2015

(54) MOWER CUTTING DECK HAVING A HEIGHT OF CUT ADJUSTMENT SYSTEM WITH DECK SUSPENSION LINKAGES THAT EACH HAVE AN EASILY ACESSIBLE THREADED ADJUSTER FOR DECK TRUING OR RAKE ANGLE SETTING PURPOSES

(71) Applicant: James W. Lancaster, Beatrice, NE (US)

(72) Inventor: James W. Lancaster, Beatrice, NE (US)

(73) Assignee: Exmark Mfg. Co., Inc., Beatrice, NE (US)

( * ) Notice: Subject to any disclaimer, the term of this patent is extended or adjusted under 35 U.S.C. 154(b) by 161 days.

(21) Appl. No.: 13/844,916

(22) Filed: Mar. 16, 2013

(65) Prior Publication Data

US 2014/0260161 A1   Sep. 18, 2014

Related U.S. Application Data

(62) Division of application No. 12/009,613, filed on Jan. 20, 2008, now Pat. No. 8,438,822.

(51) Int. Cl.
*A01D 34/00* (2006.01)
*A01D 34/74* (2006.01)

(52) U.S. Cl.
CPC .................................. *A01D 34/74* (2013.01)

(58) Field of Classification Search
USPC ........... 56/17.1, 14.9, 10.8, DIG. 22, DIG. 14
See application file for complete search history.

(56) References Cited

U.S. PATENT DOCUMENTS

| 5,065,568 | A | * | 11/1991 | Braun et al. | 56/14.9 |
|---|---|---|---|---|---|
| 5,797,252 | A | * | 8/1998 | Goman | 56/17.2 |
| 5,816,033 | A | | 10/1998 | Busboom | |
| 5,927,055 | A | * | 7/1999 | Ferree et al. | 56/15.9 |
| 6,205,754 | B1 | * | 3/2001 | Laskowski | 56/15.1 |
| 6,434,919 | B2 | * | 8/2002 | Schick | 56/15.9 |
| 6,438,930 | B1 | * | 8/2002 | Velke et al. | 56/14.7 |
| 6,442,917 | B1 | * | 9/2002 | Velke et al. | 56/14.7 |
| 6,588,188 | B2 | * | 7/2003 | Dennis | 56/16.3 |
| 6,658,831 | B2 | * | 12/2003 | Velke et al. | 56/14.7 |
| 6,868,658 | B2 | | 3/2005 | Velke et al. | |
| 7,540,134 | B1 | | 6/2009 | Reich | |
| 7,578,117 | B2 | * | 8/2009 | Shaffer et al. | 56/17.1 |
| 7,600,363 | B2 | * | 10/2009 | Porter et al. | 56/17.1 |
| 7,716,906 | B2 | * | 5/2010 | Swart | 56/17.1 |
| 7,861,502 | B1 | * | 1/2011 | Benway | 56/17.1 |
| 2003/0094071 | A1 | * | 5/2003 | Eavenson et al. | 74/562 |
| 2009/0183481 | A1 | * | 7/2009 | Lancaster et al. | 56/17.1 |

\* cited by examiner

*Primary Examiner* — Árpád Fábián-Kovács
(74) *Attorney, Agent, or Firm* — James W. Miller

(57) ABSTRACT

A mower carrying a rotary cutting deck has a height of cut system for adjusting the vertical position of the deck relative to the mower frame for changing or adjusting the height of cut. The height of cut system comprises a pair of parallel cross shafts that carry a plurality of pivotal suspension linkages that connect to the deck, the cross shafts and linkages pivoting jointly with one another and with a pivotal control lever. One of the cross shafts carries a torsion spring to counterbalance the weight of the deck. The control lever is maintained in a plurality of adjusted pivotal positions by a height selection bracket fixed to the frame with the height selection bracket being capable of having its position changed or adjusted relative to the frame by a single adjustment bolt. Each suspension linkage has its effective length adjusted by turning a threaded adjuster carried at the upper end of a connecting rod that is part of each linkage to allow the deck to be leveled relative to a reference plane. The adjustment of the height selection bracket is accomplished without affecting the length adjustments previously made to any of the suspension linkages.

5 Claims, 11 Drawing Sheets

MOWER CUTTING DECK HAVING A HEIGHT OF CUT ADJUSTMENT SYSTEM WITH DECK SUSPENSION LINKAGES THAT EACH HAVE AN EASILY ACESSIBLE THREADED ADJUSTER FOR DECK TRUING OR RAKE ANGLE SETTING PURPOSES

CROSS REFERENCE TO RELATED APPLICATIONS

This application is a division of application Ser. No. 12/009,613 filed Jan. 8, 2008.

TECHNICAL FIELD

This invention relates to a rotary cutting deck mounted to and carried on a mower. More particularly, this invention relates to a height of cut (HOC) system that vertically moves the cutting deck up and down relative to the mower frame, and thus relative to the ground, to adjust the height of cut of the grass.

BACKGROUND OF THE INVENTION

Riding mowers having a zero radius turn (ZRT) capability are well known in the mowing art. Such mowers have a frame that carries a power source, such as an internal combustion engine, for propelling the frame over the ground and for providing power for mowing. Two powered rear drive wheels are carried on the frame with the front of the frame having a pair of unpowered front wheels, the wheels collectively supporting the frame for rolling over the ground. Often, the unpowered front wheels are caster wheels.

The rear drive wheels in a ZRT mower are individually powered by separate hydraulic drive motors that receive pressurized hydraulic fluid from a hydraulic system driven by the power source of the mower. The drive motors are individually controlled by separate control levers placed adjacent an operator's seat provided on the mower frame. The mower is steered by advancing one lever farther than the other to cause one drive motor, and thus the drive wheel on one side of the mower, to rotate faster than the other drive motor and drive wheel, thereby causing the vehicle to turn. Very sharp spin or ZRT type turns can be accomplished by advancing one control lever forwardly while pulling the other control lever rearwardly to cause the drive wheels on the opposite sides of the mower to simultaneously rotate in opposite directions.

A rotary cutting deck is carried at the front of the mower. The cutting deck usually houses a plurality of cutting blades that rotate about substantially vertical axes to cut grass in horizontal cutting planes. The blades are typically staggered relative to one another with a center blade being offset forwardly of a pair of side blades located on either side of the center blade. This allows the orbits of the cutting blades to overlap without having the blades contact one another, thus avoiding the need for timing the rotation of the blades. As the mower is driven over the ground and the blades are rotated, the blades cut a relatively large unbroken swath of grass during each pass of the mower. Exmark Mfg. Co., Inc. manufactures and sells ZRT mowers of this type under its Lazer Z brand name.

To change the height of cut of the grass, the cutting deck is vertically moved up and down relative to the mower frame and thus relative to the ground to change the height of the cutting blades relative to the ground. In many known mowers, the HOC system used to do this includes multiple suspension links to the cutting deck. These movable links move up and down simultaneously with one another under the action of a single control lever. The control lever has a plurality of discrete adjusted positions relative to the mower frame, often established by the control lever engaging against a pin, to allow the height of cut of the cutting deck to be adjusted in a plurality of discrete increments. The height of cut is adjusted by changing the location of the pin within an array of adjustment holes provided therefor on the mower frame. The pin is selectively inserted by the operator into whichever adjustment hole corresponds to the desired height of cut.

In HOC systems of this type, it is desirable to be able to level the cutting deck relative to a reference plane, such as a ground plane or a rake angle plane. This can be done in prior art mowers by adjusting the effective distance between the suspension links and the cutting deck. However, in making the cutting deck leveling adjustments, the actual height of cut might vary from the nominal height of cut provided by the location of the pin at the completion of the cutting deck leveling adjustments. Thus, the operator will have to readjust the cutting deck leveling adjustments until the cutting deck is level to the desired plane at the same time the actual height of cut corresponds to the nominal height of cut. This can be a cumbersome, time consuming and labor intensive adjustment operation.

Further, the pin/hole type of HOC system provides only a plurality of discrete heights of cut. Infinite heights of cut can be obtained using threaded adjusters, but such adjusters require many turns to adjust the height of cut over a wide range of travel. Thus, it would be desirable in HOC systems to provide a system in which discrete heights of cut can be easily and quickly selected, such as by inserting a pin within a selected hole, but which would also permit the operator to quickly and easily obtain heights of cut in between the preset discrete heights of cut.

The cutting decks used on mowers of this type are often quite large and heavy. Counterbalance springs have been used in prior HOC systems to help the operator lift the cutting deck when going from a lower to a higher height of cut. However, most HOC systems of this type use a pair of tension springs as counterbalance springs. These springs surround a pair of longitudinal connecting rods that run over the top of the cutting deck adjacent opposite sides of the mower. Such springs are typically exposed and in plain view due to the location of the connecting rods. Thus, to some extent, the springs are prone to being damaged and present an obstacle that the operator has to step over if the operator were to attempt to mount the mower from either side of the cutting deck.

SUMMARY OF THE INVENTION

One aspect of this invention relates to an improved mower of the type having a mower frame. A rotary cutting deck is carried by the frame. A height of cut system vertically moves the cutting deck upwardly and downwardly relative to the frame to adjust the height of cut of the grass. The height of cut system comprises a plurality of pivotal suspension linkages connecting the cutting deck to the frame. The improvement relates to the pivotal suspension linkages with each linkage comprising a pivotal link that rotates about a substantially horizontal axis on the frame. A pivot pin is pivotally carried by the pivotal link adjacent one end thereof. An elongated connecting rod extends through a bore in the pivot pin. A lower end of the connecting rod is pivotally connected to the deck and an upper end of the connecting rod extends above the pivot pin. At least a portion of the upper end of the connecting rod is threaded. A threaded adjuster is engaged with the threaded upper end of the connecting rod and bears against the pivot pin. Rotation of the threaded adjuster on the threaded upper end of the connecting rod varies the effective length of the connecting rod between the deck and the pivot pin of the link.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
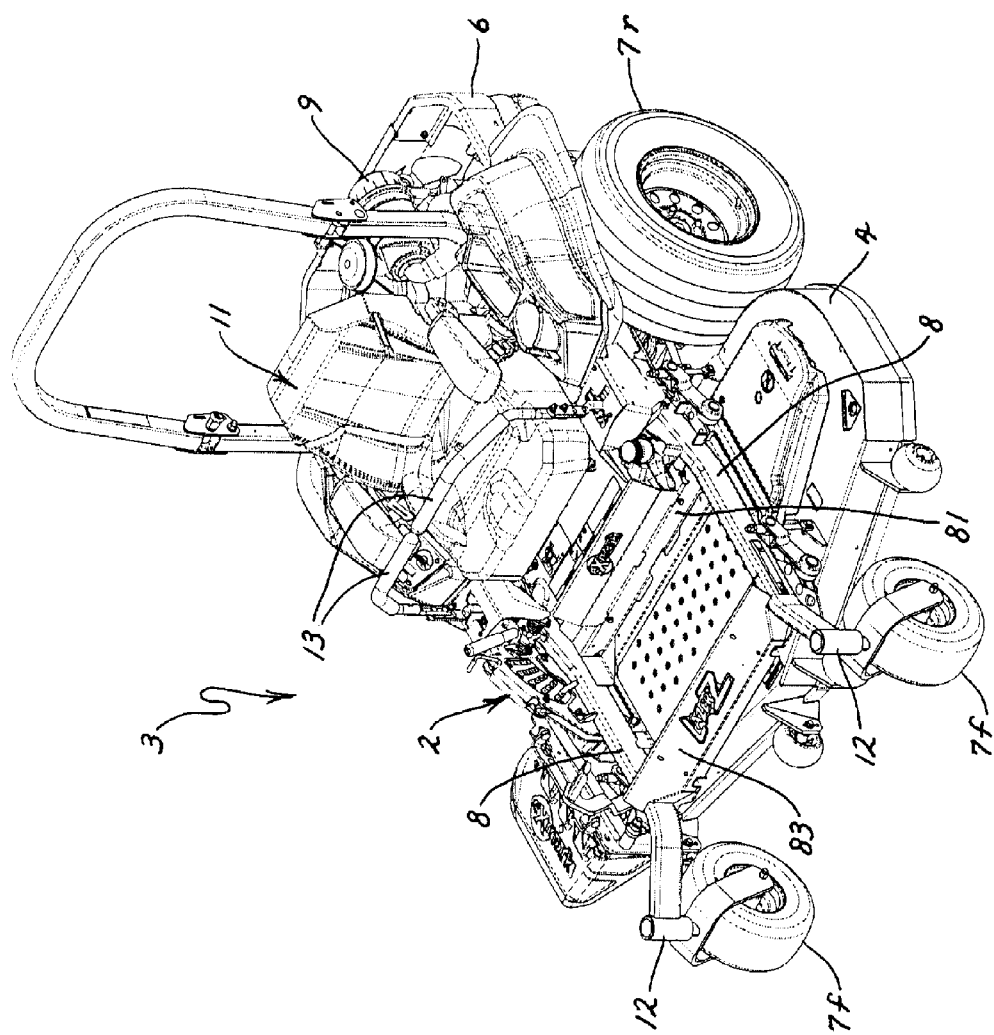
FIG. 1 is a perspective view of a mower having the HOC system of this invention for adjusting the height of cut provided by the cutting deck.

Referring first to FIG. 1, a mower 3 has a frame 6 that supports a rotary cutting deck 4 adjacent the front thereof. Frame 6 is supported for rolling over the ground by a pair of rear drive wheels 7r, only one of which is shown in FIG. 1, and by a pair of front caster wheels 7f. A power source, such as in internal combustion engine 9, is carried at the rear of frame 6. An operator's seat 11 is placed forward of engine 9 and generally between rear drive wheels 7r for carrying a seated operator. Two control levers 13 are used by the operator to control the steering and propulsion provided by rear drive wheels 7r in a manner well known for zero radius turn (ZRT) mowers. Other operational controls are provided for starting and stopping the operation of deck 4. Mower 3 as illustrated herein is similar to, but is not limited to, the Lazer Z mowers manufactured and sold by Exmark Mfg. Co., Inc., the assignee of this invention.

Figure 2:
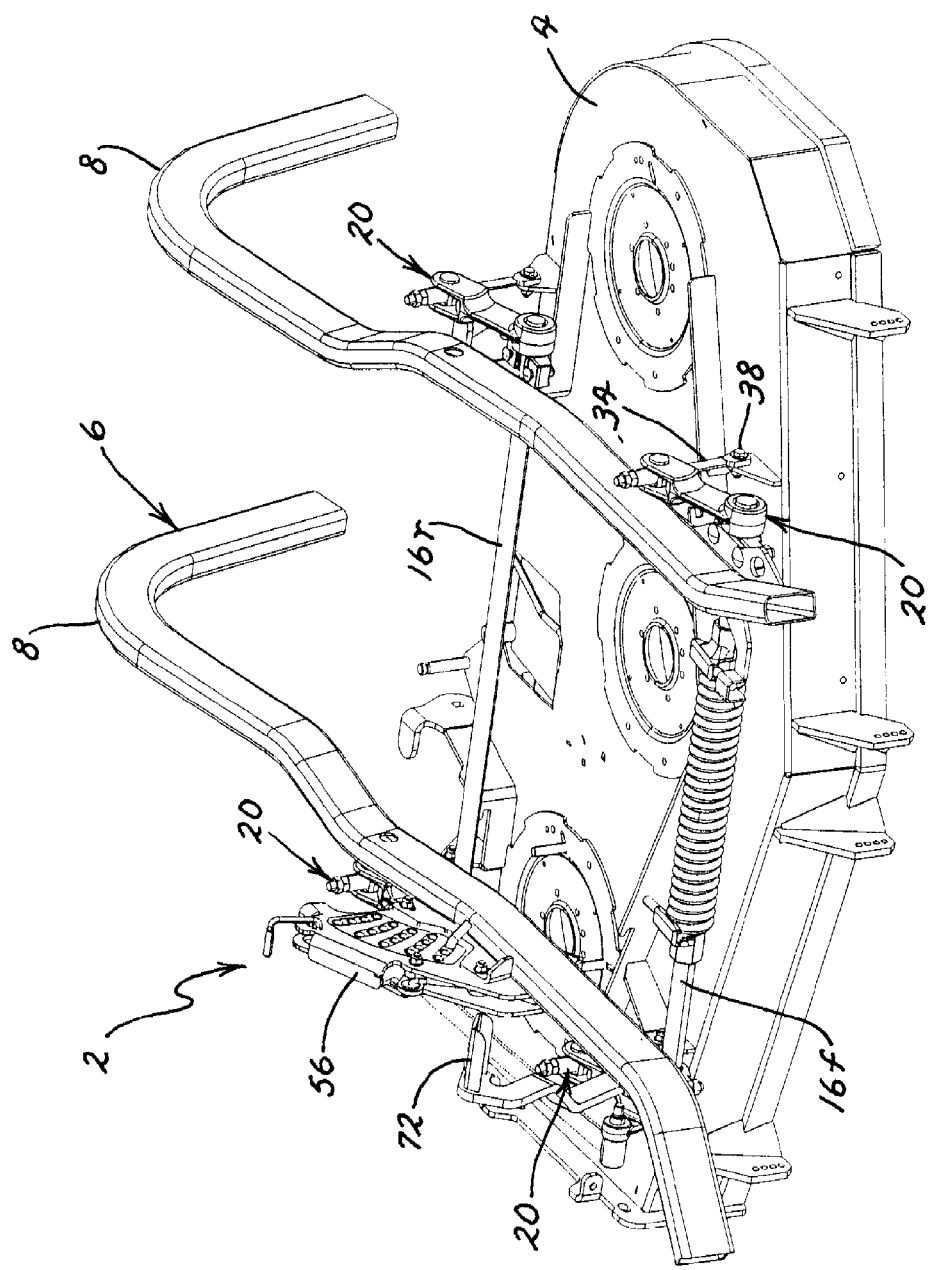
FIG. 2 is a perspective view of a portion of the frame of the mower and of a portion of the cutting deck, particularly illustrating the HOC system according to this invention for adjusting the height of cut provided by the cutting deck.

Referring now to FIG. 2, one embodiment of a height of cut (HOC) system according to this invention is generally illustrated as 2. HOC system 2 adjusts the vertical height of deck 4 relative to the ground to adjust the height of cut of the grass being mowed. Only those portions of deck 4 and of mower 3 that carry deck 4 that are needed to understand the structure and operation of HOC system 2 have been shown in FIGS. 2-11.

Referring to FIG. 1, mower frame 6 has a pair of laterally spaced, longitudinally extending side rails 8. Side rails 8 are secured together by a plurality of longitudinal and lateral cross members welded thereto. Vertical sleeves or hubs 12 are provided at the front of side rails 8. Hubs 12 rotatably journal the vertical pivot stems of the front caster wheels 7f. Rear driven wheels 7r are mounted laterally outboard of side rails 8 towards the rear ends thereof. Deck 4 is carried beneath the front portions of side rails 8 as shown in FIGS. 1 and 2.

Figure 11:
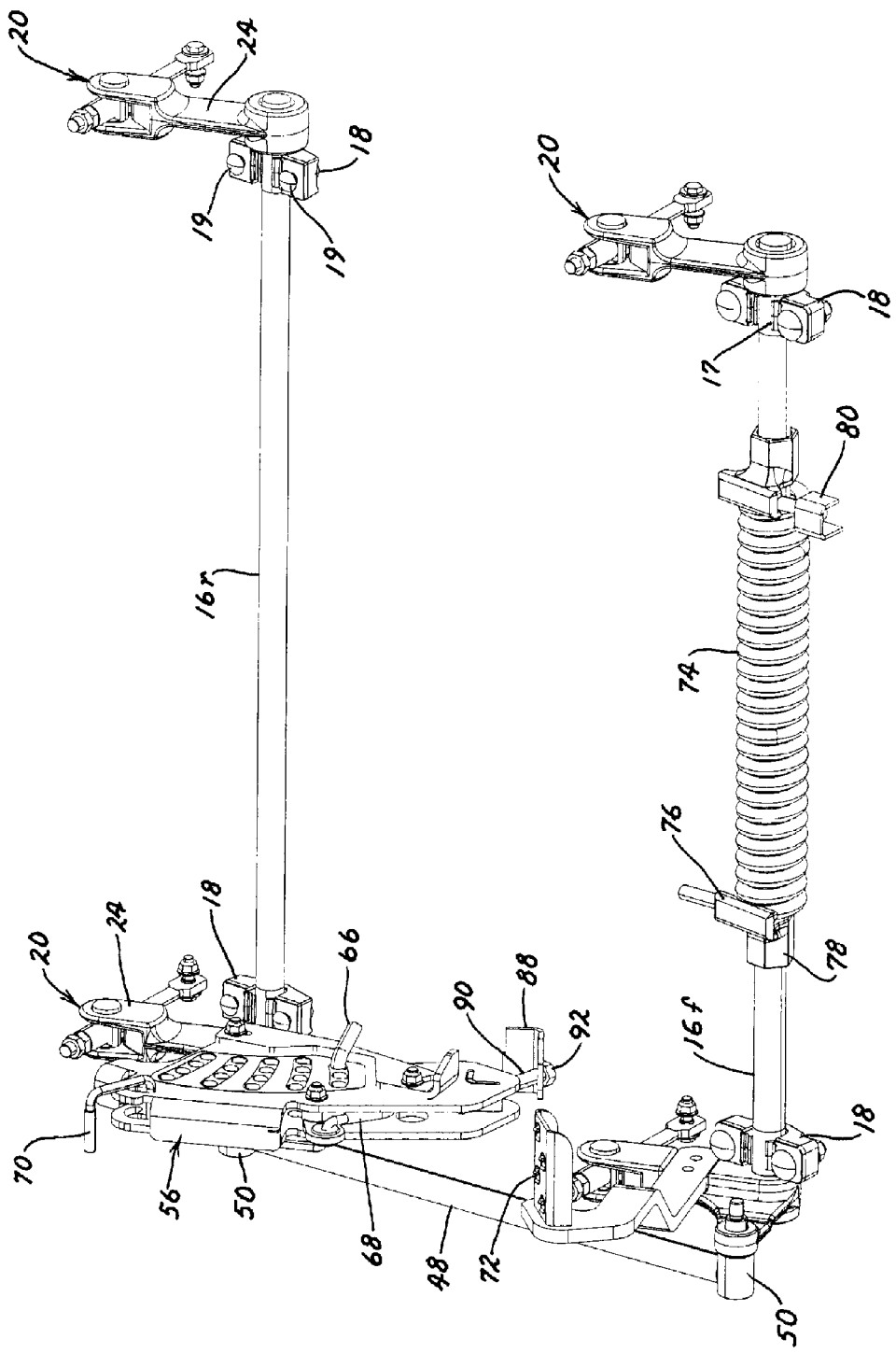
FIG. 11 is a perspective view of the components of the HOC system of FIG. 2.

Referring now to FIGS. 2 and 11, HOC system 2 comprises front and rear cross shafts 16f and 16r that are parallel to one another. Both cross shafts 16 are rotatably journalled on mower frame 6 by laterally spaced pairs of bearing blocks 18. Bearing blocks 18 are bolted by bolts 19 to a fixed portion 14 of mower frame 6 adjacent each side rail 8. See FIG. 4. Cross shafts 16 will thus rotate about substantially horizontal pivot axes that extend laterally across and overlie the middle portions of the front and rear sides of deck 4.

Figure 4:
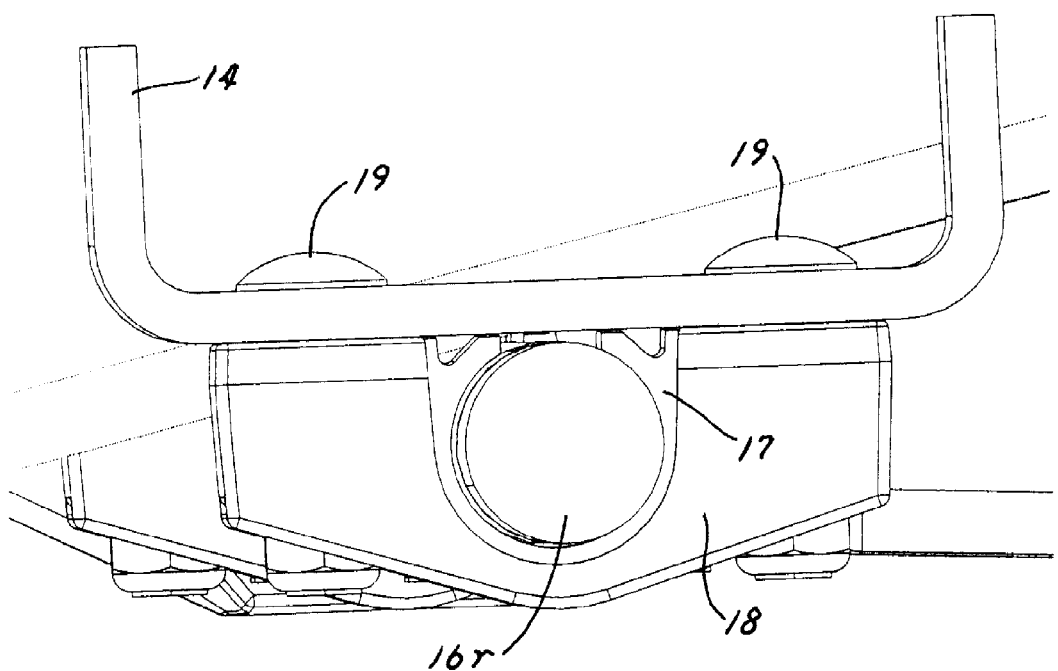
FIG. 4 is a perspective side view of one end of one cross-shaft of the HOC system of FIG. 2, particularly illustrating the bearing with an inner Delrin sleeve for supporting the end of the cross-shaft.

Referring further to FIG. 4, each bearing block 18 is generally U-shaped and is bolted to the underside of the portion 14 of frame 6 to have a low profile. Bearing block 18 is preferably metallic. An inner plastic sleeve 17, made of Delrin, is carried within bearing block 18. Sleeve 17 extends around approximately 270° or so, receives one end of a cross shaft 16, and provides a low friction contact surface with cross shaft 16. Thus, the combination of a U-shaped bearing block 18 with an inner plastic sleeve 17 effectively journals the end of a cross shaft 16 with both reduced friction and low profile characteristics, thus constituting an improvement over simply using a square or rectangular Delrin block with a shaft receiving bore as the bearing block. In addition, plastic sleeve 17 does not require the frequent applications of lubricant that are typically needed for conventional cylindrical metallic bushings.

Each cross shaft 16 terminates in an outer end that is outboard of the adjacent side rail 8. Each end of each cross shaft 16 includes a pivotal suspension linkage 20 that connects the end of cross shaft 16 to a fixed bracket 22 on deck 4. Thus, deck 4 is suspended or hung beneath cross shafts 16 by the four pivotal suspension linkages 20. Since linkages 20 are spread out over deck 4 both laterally and longitudinally, i.e. there are four linkages 20 arranged in a rectangular pattern relative to deck 4, deck 4 is supported in a plane defined by the points where the four suspension linkages 20 connect to deck 4.

Figure 9:
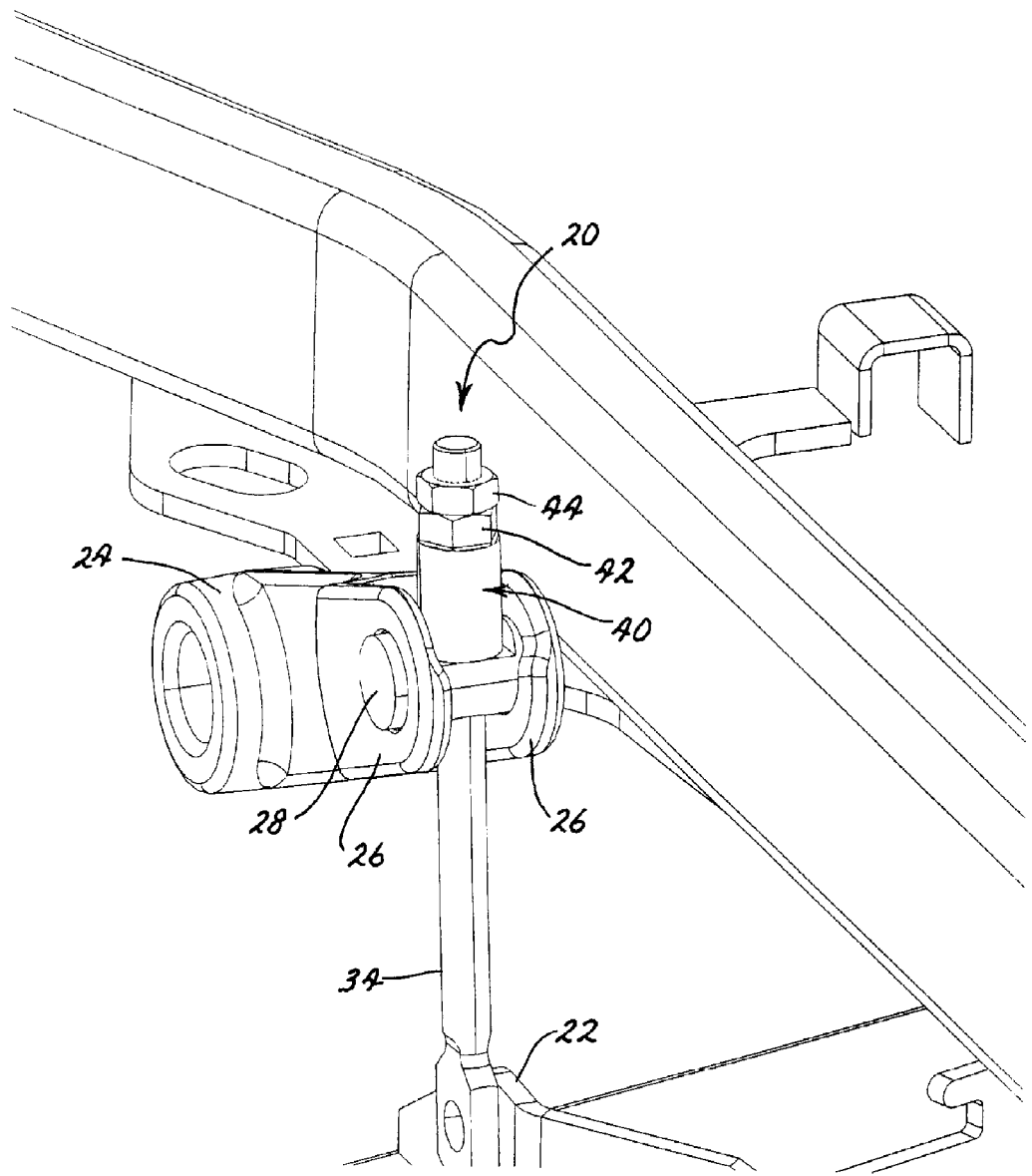
FIG. 9 is an enlarged perspective view of another portion of the HOC system of FIG. 2, particularly illustrating one of the pivotal suspension linkages that suspend the cutting deck.
Figure 10:
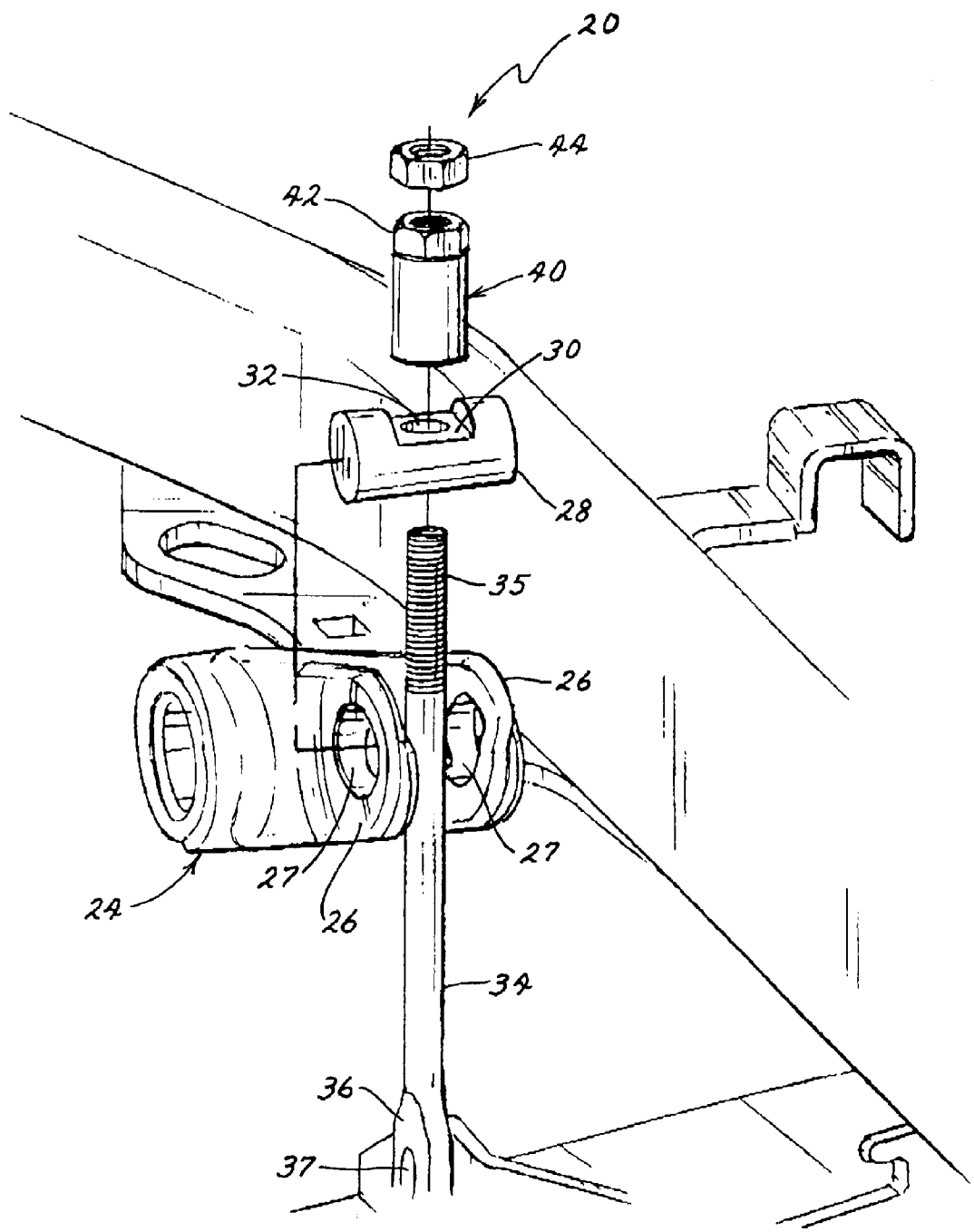
FIG. 10 is an enlarged perspective view similar to FIG. 9 of the suspension linkage, but with portions thereof having been exploded to illustrate the threaded adjuster used to fine tune the height at which the cutting deck is suspended by the pivotal link.

Referring now to FIGS. 9 and 10, each suspension linkage 20 comprises a rearwardly extending pivotal link 24 that is fixed to one end of one cross shaft 16 to rotate with cross shaft 16. The other end of link 24 is forked having a pair of parallel fork arms 26. A pivot pin 28 is pivotally supported between fork arms 26 with the outer ends of pivot pin 28 being received in a pair of aligned bores 27 in fork arms 26. The top central part of pivot pin 28 is cut away to form a flat, upwardly facing bearing surface 30 in the middle of pivot pin 28. Pivot pin 28 includes a generally vertically extending bore 32 passing from top to bottom through pivot pin 28 with the upper end of bore 32 being located in the middle of upwardly facing bearing surface 30 as shown in FIG. 10.

Figure 5:
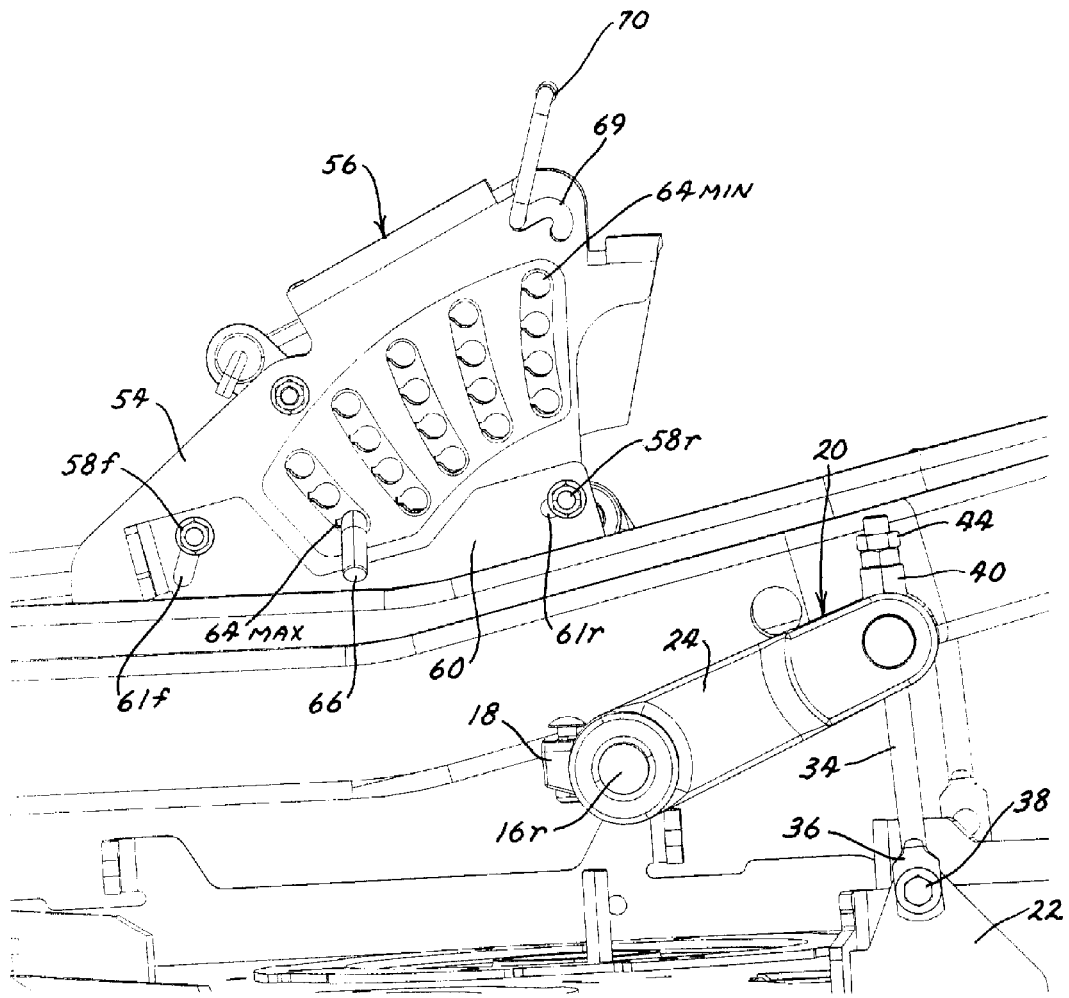
FIG. 5 is an enlarged perspective view of another portion of the HOC system of FIG. 2, particularly illustrating a height selection pin of the HOC system installed in one selected height adjustment hole in an array of height adjustment holes provided in a height selection bracket.

Suspension linkage 20 further includes a generally vertical connecting rod 34 having an eyelet 36 on the lower end thereof. As shown in FIG. 5, a bolt 38 passes through a hole 37 in eyelet 36 and into and through deck bracket 22 with the shank of bolt 38 serving as a pivot connection between connecting rod 34 and deck 4. Connecting rod 34 extends upwardly from its pivotal connection to deck 4 through bore 32 in pivot pin 28. Connecting rod 34 is long enough so that its upper end terminates well above pivot pin 28. The upper end of connecting rod 34 is threaded as shown at 35 in FIG. 10. Connecting rod 34 and pivot pin 28 are both solid metallic members and are not themselves flexible.

The threaded upper end 35 of connecting rod 34 carries a threaded adjuster 40 in the form of a hollow cylinder with a fixed nut 42 carried on the top thereof. Connecting rod 34 is threadedly engaged with the threads in adjuster 40, namely with the threads in nut 42. This allows adjuster 40 to be threaded up and down along the threaded upper end of connecting rod 34 to adjust the effective length of connecting rod 34 between link 24 and deck 4. This permits precise adjustment of the effective length of connecting rod 34 for deck leveling purposes as will be described hereafter. Once a desired position of adjuster 40 is reached, this position can be locked by tightening a jam nut 44 down on top of adjuster 40.

Pivotal links 24 used in suspension linkages 20 on the right side of deck 4 are bell cranks with each of these links 24 also having a forwardly extending link arm 46. See FIG. 7. Links 24 used in suspension linkages 20 on the left side of deck 4 do not have such forwardly extending link arms 46. See FIGS. 2 and 11. Link arms 46 of the right side suspension linkages 20 are connected together by a longitudinal connecting rod 48 whose ends are pivotally connected to link arms 46 by pivots 50. Longitudinal connecting rod 48 rotationally links cross shafts 16. Rotation of one cross shaft 16 will rotate the other cross shaft 16 in the same direction and in the same amount by virtue of longitudinal connecting rod 48. It should also be apparent that this will cause all four pivotal links 24 in all four suspension linkages 20 to be simultaneously rotated together in the same manner, i.e. in the same direction and amount as the joint rotation of cross shafts 16.

Figure 6:
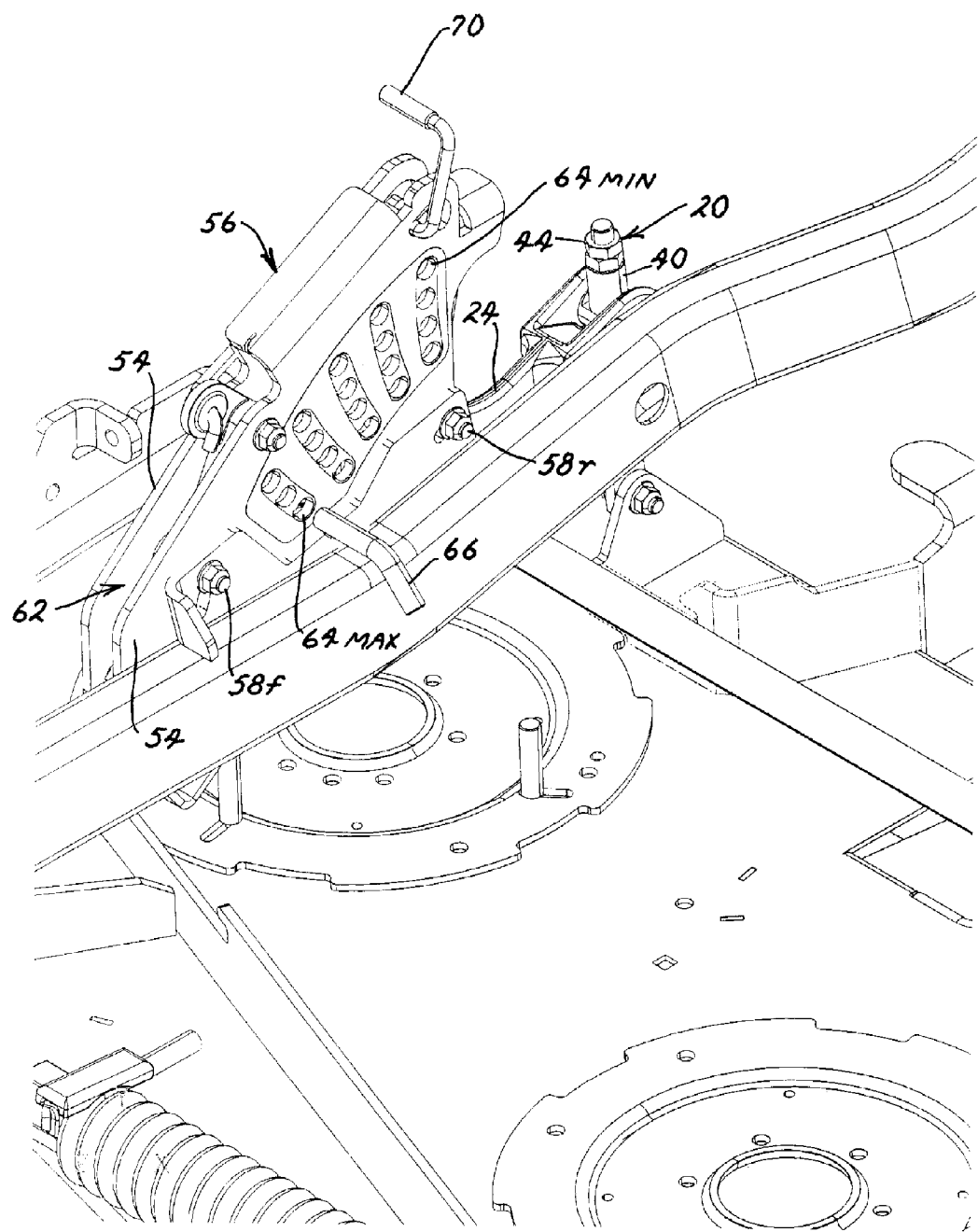
FIG. 6 is a perspective view similar to FIG. 5, particularly illustrating the height selection pin having been disengaged from any of the height adjustments holes in the height selection bracket.
Figure 7:
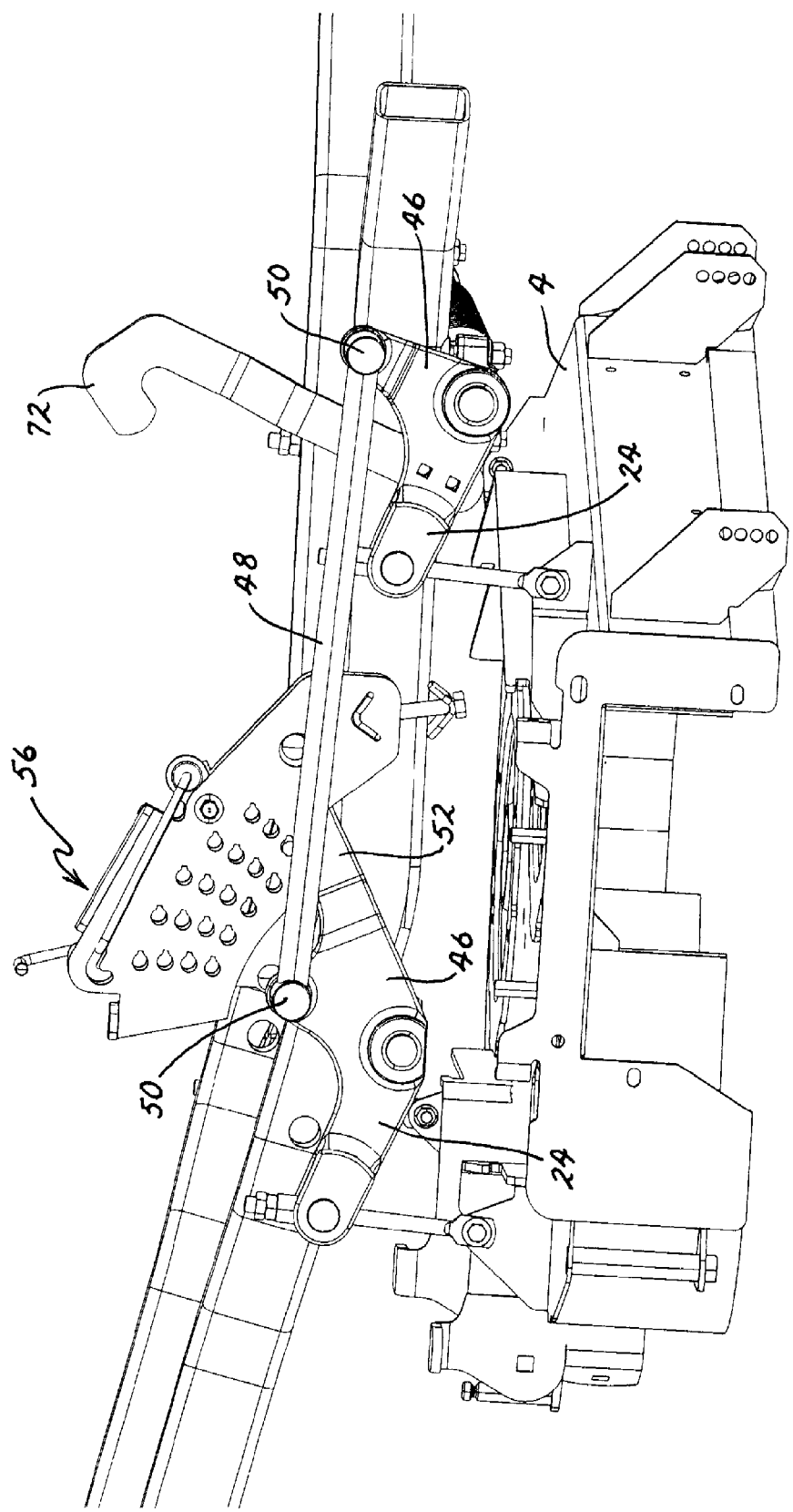
FIG. 7 is a perspective view of the height selection bracket and HOC system of FIG. 2 from the opposite side than the side depicted in FIGS. 3 and 4.
Figure 8:
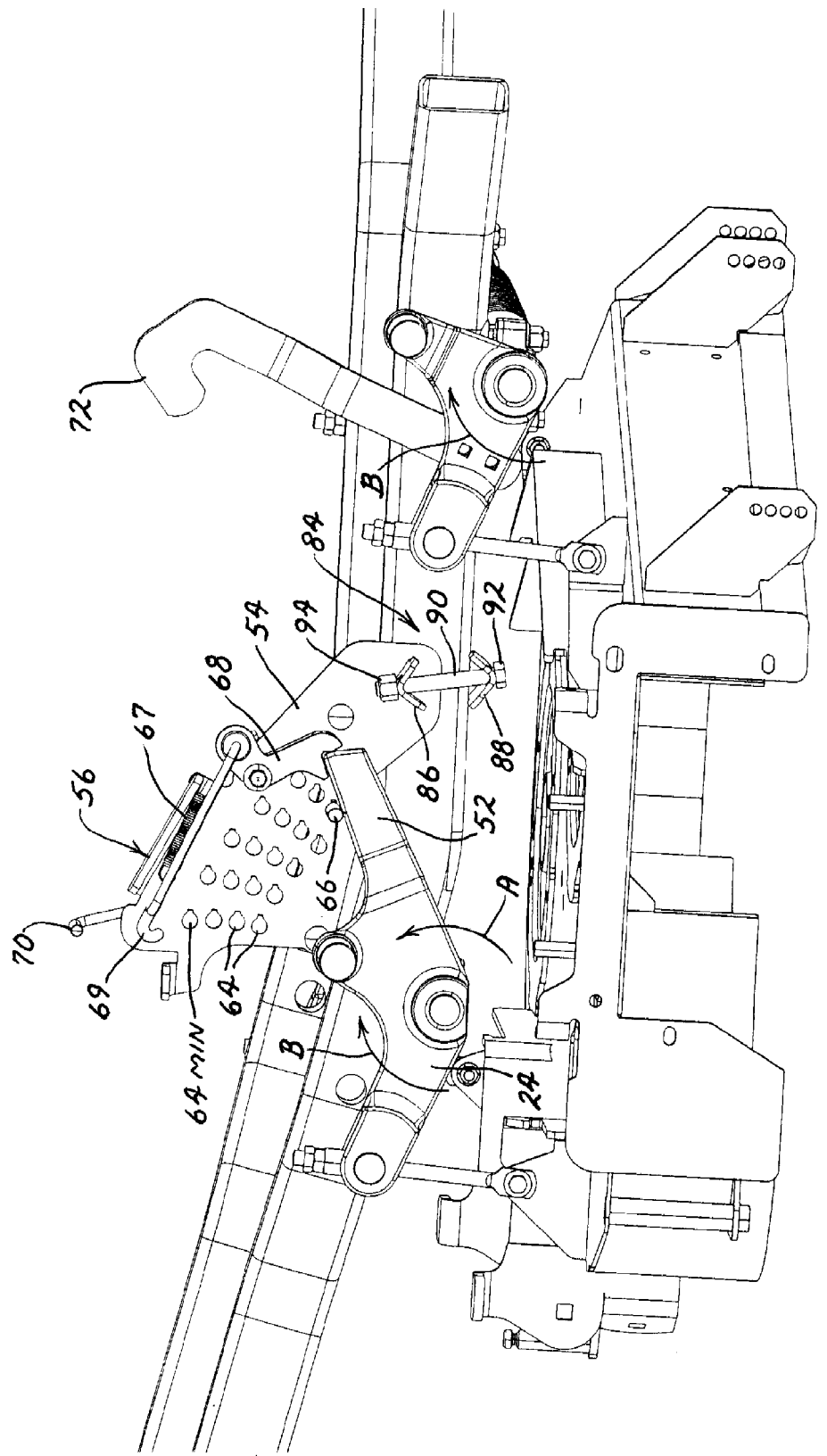
FIG. 8 is a perspective view similar to FIG. 7, but having the longitudinal connecting rod and the outside of the height selection bracket removed to better illustrate the single point adjustment bolt for tilting or pivoting the height selection bracket relative to the mower frame.

Referring now to FIG. 8, forwardly extending link arm 46 in the rear suspension linkage on the right side includes a forwardly protruding finger that forms a control lever 52 whose rotational position determines the height of cut provided by HOC system 2. Control lever 52 extends into and between a pair of spaced plates 54 that make up a height selection bracket 56 that is fixed to mower frame 6. As shown in FIG. 6, the innermost plate 54 of height selection bracket 56 is secured by front and rear bolts 58f and 58r to an upwardly extending mounting flange 60 on the right side rail of mower frame 6. The outermost plate 54 of height selection bracket 56 is carried and supported by the innermost plate with the two plates 54 being spaced apart by a gap 62. It is this gap 62 into which control lever 52 extends.

Figure 3:
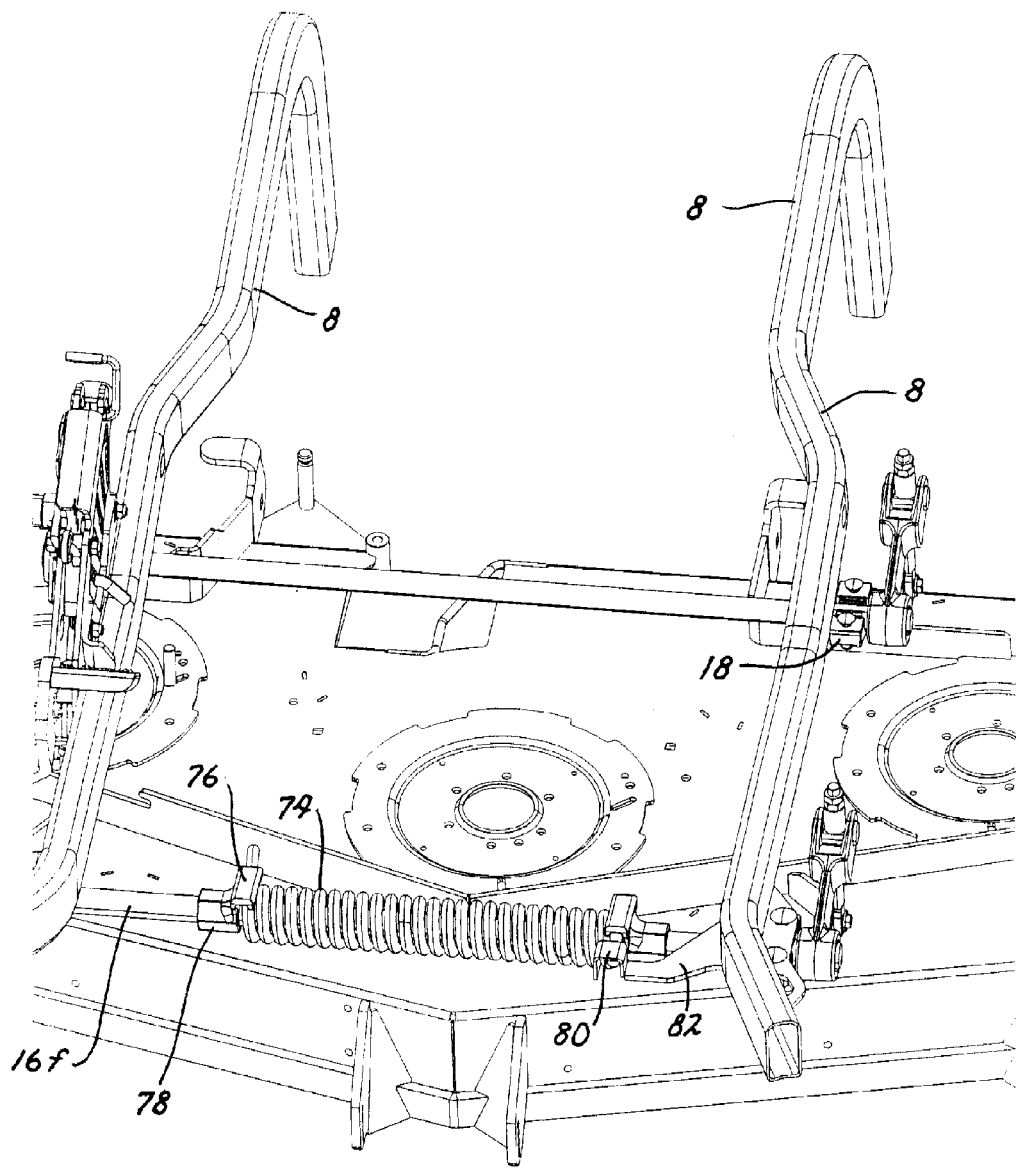
FIG. 3 is an enlarged perspective view of a portion of the HOC system of FIG. 2, particularly illustrating a torsion spring for biasing the cutting deck upwardly relative to the mower frame for transferring weight from the cutting deck to the mower frame.

Height selection bracket 56 carries an array of height adjustment holes 64. A height selection pin 66 can be inserted into any one hole 64 in height selection bracket 56 to select a different height of cut. FIG. 6 shows height selection pin 66 disconnected from any height adjustment hole 64. FIGS. 3, 5 and 6 show height selection pin 66 inserted into a height adjustment hole $64_{max}$ that provides the maximum height of cut. Height selection pin 66 simply serves as a stop that coacts against control lever 52 to set the rotational position of control lever 52. The weight of deck 4 acting through HOC system 2 will tend to always bias control lever 52 into engagement with height selection pin 66.

As shown in FIG. 8, height selection bracket 56 includes a pivotal latch 68 for latching control lever 52 in the maximum height of cut position. If the operator wishes to lower the height of cut to something other than the maximum height of cut, the operator will reposition height selection pin 66 into one of the other height of cut adjustment holes 64. The operator can then release pivotal latch 68 by pulling back on a latch handle 70. Once HOC system 2 is unlatched, the rest of HOC system 2, including cross shafts 16 and the four pivotal links 24, will all rotate in the counter-clockwise direction A in FIG. 8 until control lever 52 contacts height selection pin 66 in its new location. Rotation in the direction A in FIG. 8 causes deck 4 to lower relative to mower frame 6 and relative to the ground to decrease the height of cut. The minimum height of cut is provided when height selection pin 66 is located in height adjustment hole 64 that is highest and farthest to the rear in the array of height adjustment holes 64, which hole is indicated at $64_{min}$ in FIG. 8.

The operator can move deck 4 back up from a lower to a higher height of cut using a foot pedal 72 that is secured to one of the pivotal links 24, namely to pivotal link 24 in right front suspension linkage 20 in HOC system 2. Pushing down on foot pedal 72 causes HOC system 2 to rotate in direction B in FIG. 8, which is a direction in which deck 4 moves upwardly. As this happens, control lever 52 will start to rotate forwardly relative to the array of height adjustment holes 64 in height selection bracket 56. When the rear edge of control lever 52 becomes adjacent height adjustment hole 64 corresponding to the desired height of cut, the operator can move height selection pin 66 into that corresponding hole. The operator can then release foot pedal 72 and the weight of deck 4 will keep control lever 52 abutted with height selection pin 66 in its new hole. Alternatively, the operator can raise deck 4 to its maximum height of cut position before doing any repositioning of height selection pin 66.

If deck 4 is returned by the operator to its maximum height of cut position, pivotal latch 68 will be engaged by control lever 52 as deck 4 rises. The bias of a spring 67 had returned pivotal latch 68 to its usual position in the path of control lever 52 after pivotal latch 68 was initially unlatched by the operator pulling rearwardly on handle 70 and control lever 52 swung past latch 68 when deck 4 was being lowered. However, with deck 4 now being raised, control lever 52 is able to cam or push latch 68 out of the way against the bias of spring 67 as deck 4 moves back towards its maximum height of cut position. Once control lever 52 clears latch 68, latch 68 reengages against control lever 52 as shown in FIG. 8 to again hold or lock deck 4 in its maximum height of cut position. Thus, latch 68 automatically resets into a locking relationship with control lever 52 whenever deck 4 is moved back to its maximum height of cut position.

There are some instances where it is desirable for latch 68 to be disabled during operation of HOC system 2. For example, there are times when the operator desirably wants to move deck 4 upwardly and downwardly numerous times in a short time interval using just foot pedal 72. In this situation, having to unlock latch 68 and having latch 68 automatically reset becomes a hindrance.

Accordingly, height selection bracket 56 includes a downwardly facing, J-shaped locking slot 69 at the rear end of the channel 71 in which handle 70 is received. If the operator now pulls on handle 70 sufficiently rearwardly and then downwardly, handle 70 can be moved down into locking slot 69. In this position, the bias of spring 67 will hold or retain handle 70 in locking slot 69 with latch 68 simply being pivoted upwardly into a position where latch 68 is held clear of the path of travel of control lever 52. In this position, latch 68 is effectively disabled and deck 4 will not be locked into its maximum height of cut position every time deck 4 approaches that position. Slot 69 is a simple and effective way of disabling the operation of latch 68.

To help the operator overcome the weight of deck 4 in raising deck 4 using foot pedal 72, a single torsion spring 74 is provided placed concentrically around front cross shaft 16$f$ of HOC system 2. As best shown in FIG. 3, one end of torsion spring 74 bears up against the rear edge of a tab 76 of a collar 78 that is secured to front cross shaft 16$f$. The other end of torsion spring 74 is restrained or held down by a downwardly facing U-shaped channel 80 that is fixed to one of the side rails of mower frame 6 by a bracket 82. Thus, as torsion spring 74 tries to unwind, the end bearing against the rear edge of tab 76 of collar 78 on front cross shaft 16$f$ rotates cross shaft 16 in the same clockwise direction B as is achieved when the operator pushes down on foot pedal 72, namely in the direction in which deck 4 is raised. This helps counterbalance the weight of deck 4 and reduces the amount of downforce the operator has to apply to foot pedal 72 to raise deck 4.

The use of a single torsion spring 74 around one cross shaft 16 of HOC system 2 is preferred as it simplifies prior art designs in which multiple compression springs were used around various connecting rods. In addition, referring to FIG. 1, both the front and rear cross shafts 16 used in HOC system 2 can be conveniently covered by various shields 81, escutcheon plates, or portions of the mower floorboard. Preferably, front cross shaft 16$f$ is covered by a V-shaped foot rest 83. The operator can rest his feet atop or against the rear side of foot rest 83 while operating the mower. This also hides, covers and protects torsion spring 74 as well as front cross shaft 16$f$. This is a further advantage over the exposed and unprotected springs in prior art designs.

Suspension linkages 20 disclosed as part of HOC system 2 of this invention permit the operator to easily and precisely level deck 4 relative to a flat plane, such as a reference ground plane or a fore and aft rake angle plane. The effective length of each connecting rod 34 between pivotal link 24 in each suspension linkage and deck 4 can be precisely adjusted by the position of adjuster 40 along connecting rod 34. If deck 4 needs to be raised at one suspension linkage 20 and lowered at another to level deck 4, this is done by appropriate rotation of adjusters 40 of the involved suspension linkages 20 in opposite directions. This is easily done simply by loosening jam nut 44 in each suspension linkage 20 and then applying a wrench to nut 42 on each adjuster 40 to thread adjuster 40 either upwardly or downwardly. When just enough movement of adjuster 40 has been accomplished, jam nuts 44 can be retightened.

In addition to the individual adjustments that are designed as part of each suspension linkage 20, a single point adjustment 84 is further provided for moving the position of height selection bracket 56 relative to mower frame 6. Single point adjustment 84 is best shown in FIG. 8. Single point adjustment 84 comprises a first, inverted V-shaped bracket 86 fixed to height selection bracket 56 and extending between side plates 54 thereof, a second upright V-shaped bracket 88 fixed to the underside of the adjacent side rail 8 of mower frame 6, and a threaded adjustment bolt 90 passing through the two V-shaped brackets 86 and 88. The head 92 of bolt 90 and the nut 94 carried on the top end of bolt 90 are both accessible to the operator.

In using single point adjustment 84 on height selection bracket 56, the operator first loosens the bolts 58$f$ and 58$r$ that lock height selection bracket 56 to the mounting flange 60. When both bolts 58$f$ and 58$r$ are loosened, bracket 56 can move relative to slots 61$f$ and 61$r$ in mounting flange 60. Slots 61$f$ and 61$r$ are shaped to allow bracket 56 to rotate or pivot about the axis of rear cross shaft 16$r$. In any event, with bracket 56 thus loosened, the operator can grip both the head 92 of bolt 90 and nut 94 with suitable tools and rotate one or the other to move the two V-shaped brackets 86 and 88 closer towards one another or further away from one another. This will rotate the entire height selection bracket 56 slightly to move height selection pin 66 either closer towards or further away from control lever 52, thus providing a further incremental adjustment of HOC system 2 using just the single bolt 90 that is part of single point adjustment 84.

Single point adjustment 84 has various uses. If deck 4 has been leveled relative to a reference ground or rake angle plane by individually adjusting the various suspension linkages 20 as need be, it may be that the actual height of cut being delivered by deck 4 will vary slightly from the nominal height allegedly being provided by height selection pin 66. In other words, height selection pin 66 might be positioned to deliver a 1" height of cut, but it is possible that the actual height of cut being delivered will be 0.9", or 1.1", or the like. Thus, single point adjustment 84 allows the operator to true up the actual height of cut with the nominal height of cut by using bolt 90 to adjust the position of the entire height selection bracket 56 without affecting the deck leveling relative to the reference plane. Once this truing up process is finished, the operator can then lock height selection bracket 56 in this position by tightening down all the bolts 58 used to secure height selection bracket 56 to flange 60 on side rail 8.

Another possible use of single point adjustment 84 is to be able to obtain intermediate heights of cut that are located in between the discrete heights of cut provided by the various height adjustment holes 64 in height selection bracket 56, again without affecting the deck leveling provided by the adjustment of the suspension linkages 20. For example, if height adjustment holes 64 in height selection bracket 56 provide only ¼" incremental changes in the height of cut, one could get smaller incremental changes from a given position, e.g. a ⅛" change, by using single point adjustment 84. In other words, the operator would place height selection pin 66 in one of the two holes that are closest to the actual desired height of cut and then appropriately rotate single point adjustment 84 in the correct direction to additionally move pin 66 the right amount needed to get the smaller incremental change that was desired.

Various modifications of this invention will be apparent to those skilled in the art. Thus, the scope of the invention shall be limited only by the appended claims.

I claim:

1. An improved mower of the type having a mower frame, a rotary cutting deck carried by the frame, a height of cut system for vertically moving the cutting deck upwardly and downwardly relative to the frame to adjust the height of cut of the grass, wherein the height of cut system comprises a plurality of pivotal suspension linkages connecting the cutting deck to the frame, wherein the improvement relates to the pivotal suspension linkages with each linkage comprising:
   a) a pivotal link that rotates about a substantially horizontal axis on the frame;
   b) a pivot pin pivotally carried by the pivotal link adjacent one end thereof;
   c) an elongated connecting rod extending through a bore in the pivot pin, wherein a lower end of the connecting rod is pivotally connected to the deck and an upper end of the connecting rod extends above the pivot pin, and wherein at least a portion of the upper end of the connecting rod is threaded; and d) a threaded adjuster engaged with the threaded upper end of the connecting rod and bearing against the pivot pin, wherein rotation of the threaded adjuster on the threaded upper end of the connecting rod varies the effective length of the connecting rod between the deck and the pivot pin of the link;

wherein a top central portion of the pivot pin is recessed or cut away to form a flat, upwardly facing bearing surface in the pivot pin with an upper end of the bore being located in the upwardly facing bearing surface, and wherein the threaded adjuster comprises a hollow cylinder whose lower end is received within the recessed or cut away portion of the pivot pin to be in abutting engagement with the upwardly facing bearing surface.

2. The mower of claim 1, wherein the one end of the link carrying the pivot pin is forked and comprises a pair of parallel, laterally spaced fork arms, wherein the pivot pin is pivotally journalled in aligned bores in the fork arms, and wherein the connecting rod passes upwardly between the fork arms as it passes through the bore in the pivot pin with the upper end of the connecting rod and the threaded adjuster being accessible from above the fork arms.

3. The mower of claim 1, wherein a threaded nut is fixedly attached to an upper end of the hollow cylinder such that the threads of the fixed nut comprise the threads of the threaded adjuster.

4. The mower of claim 3, wherein the threaded upper end of the connecting rod passes through the hollow cylinder and the fixed nut comprising the threaded adjuster and extends above the fixed nut, and further including a jam nut threadedly received onto the threaded upper end of the connecting rod above the fixed nut for the purpose of locking the threaded adjuster in an adjusted position by tightening the jam nut down onto the fixed nut.

5. The mower of claim 1, wherein the pivotal links of the plurality of pivotal suspension linkages are mechanically coupled to one another to simultaneously pivot together as a unit to change the height of cut, and wherein a single control member is coupled to the mechanically coupled suspension linkages such that pivoting of the control member is accompanied by simultaneous pivoting of the mechanically coupled suspension linkages, the control member being selectively movable by an operator action during a height of cut adjustment operation, and wherein the threaded adjusters for each pivotal link of each pivotal suspension linkage are independently adjusted by the operator to level or true up the cutting deck relative to the desired height of cut or to establish a desired rake angle of inclination relative to the desired height of cut.

* * * * *